United States Patent [19]

Gajjar

[11] 4,300,126

[45] Nov. 10, 1981

[54] METHOD AND APPARATUS, FOR POWER LINE COMMUNICATIONS USING ZERO CROSSING LOAD INTERRUPTION

[75] Inventor: Jagdishchandra T. Gajjar, Clifton Park, N.Y.

[73] Assignee: General Electric Co., Schenectady, N.Y.

[21] Appl. No.: 139,437

[22] Filed: Apr. 11, 1980

[51] Int. Cl.³ .............................................. H04B 3/54
[52] U.S. Cl. ........................... 340/310 A; 340/310 R; 340/825.50
[58] Field of Search ........ 340/310 R, 310 A, 310 CP, 340/151, 147 LP, 163, 152 R, 152 T; 307/3, 149

[56] References Cited

U.S. PATENT DOCUMENTS

| | | | |
|---|---|---|---|
| 3,689,886 | 9/1972 | Durkee | 340/310 A |
| 3,909,821 | 9/1975 | Jagoda et al. | 340/310 CP |
| 3,944,723 | 3/1976 | Fong | 340/147 T |
| 3,973,087 | 8/1976 | Fong | 340/310 R |
| 3,973,240 | 8/1976 | Fong | 340/151 |
| 4,087,701 | 5/1978 | Anderson | 340/310 A |
| 4,101,834 | 7/1978 | Stutt | 340/310 A |
| 4,109,204 | 8/1978 | Kincaid et al. | 375/58 |
| 4,131,882 | 12/1978 | Hollabaugh et al. | 340/310 A |
| 4,135,181 | 1/1979 | Bogacki et al. | 340/310 A |
| 4,161,720 | 7/1979 | Bogacki | 340/150 |

Primary Examiner—James J. Groody
Attorney, Agent, or Firm—Geoffrey H. Krauss; James C. Davis; Marvin Snyder

[57] ABSTRACT

In a system for communicating information over a power line network, connection of power loads is interrupted in the vicinity of zero crossings of the A.C. power line waveform to provide a high impedance condition during which the transmitters and receivers of the power line communication carrier system can be efficiently coupled to power network transformer secondary windings in order to improve communications reliability. The communications apparatus is coupled to the secondary winding through a capacitance, chosen to substantially series-resinate the leakage inductance presented by transformer secondary winding. Each load is connected through an interruption device to the secondary winding, with the interruption device interrupting the flow of current from the secondary winding to the associated load, responsive to both detection of each zero crossing of a power distribution network voltage waveform and to the presence of the power line carrier communications signal.

14 Claims, 6 Drawing Figures

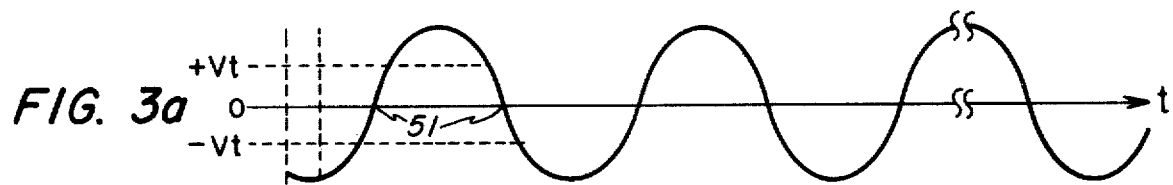
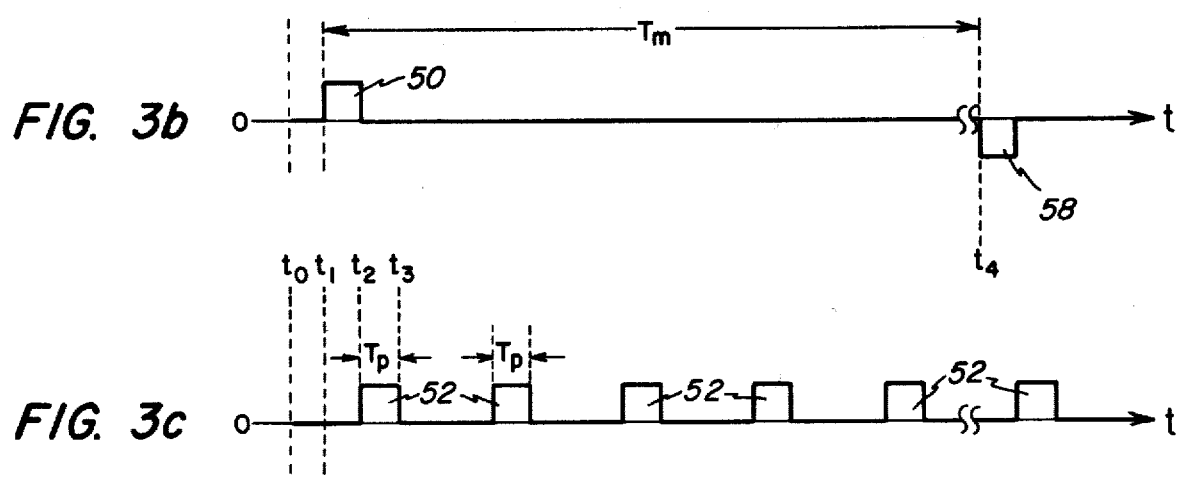
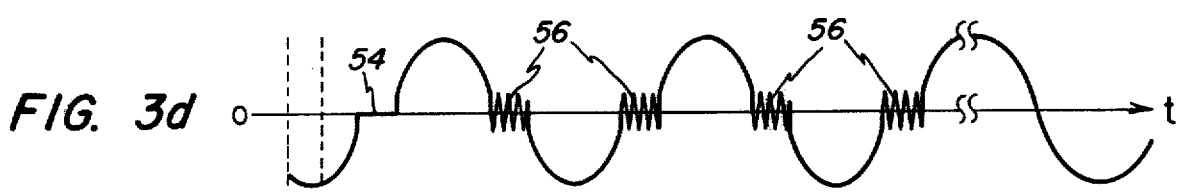
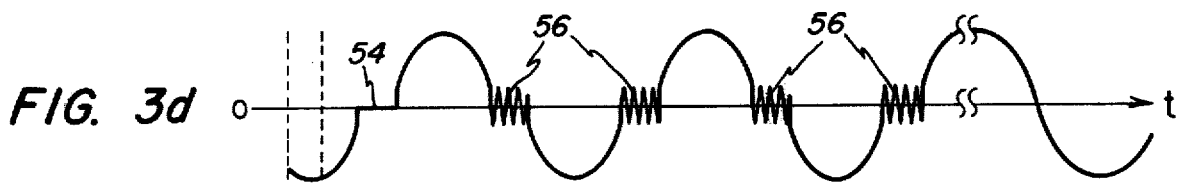

METHOD AND APPARATUS, FOR POWER LINE COMMUNICATIONS USING ZERO CROSSING LOAD INTERRUPTION

BACKGROUND OF THE INVENTION

The present invention concerns power line communication systems and, more particularly, a novel method for selectively interrupting connection, in the vicinity of zero crossings of the network waveform, to loads connected thereto to provide a high impedance condition for enabling transmitters and rereceivers of the carrier communication system to be efficiently coupled to the network for improved communications reliability.

It is well known that information may be communicated between different points on a network of conductors, such as the commercial power distribution network and the like. As an example, in a power line carrier (PLC) communications system, a carrier signal, at a carrier frequency several orders of magnitude greater than the power line frequency (60 Hz. in the United States), may be transmitted in either direction between individual locations (such as a residence, office building, manufacturing plant and the like) and a central facility (such as a power company substation main distribution transformer location and the like). To assure reliable communications, it is desired that as high a signal-to-noise ratio be present for the transmitted carrier, at any carrier-receiving location. However, such PLC signals will generally be required to be transmitted through at least one transformer, typically the distribution transformer serving to reduce the network voltage, which may be on the order of 13.2 KV., to the distribution voltage, which may be on the order of 120 V. Such transformers typically have a leakage reactance deliberately designed so as to limit short-circuit current in the distribution transformer in the event of a secondary circuit fault. This leakage reactance provides an impedance, in series with the transformer secondary winding, which is typically equal to 5-10% of the nominal full load impedance at the power line frequency. At frequencies utilized for PLC communications, the impedance of this leakage reactance is even larger than the power line frequency impedance thereof and tends to greatly attenuate the PLC carrier waveform, thereby reducing the signal-to-noise ratio at the PLC receiver. A method for reducing the amount of attenuation, due to coupling through a distribution transformer, of PLC communications signals, and without the use of a capacitor bypass across the distribution transformer or the use of apparatus for repeating the signal around the transformer, is highly desirable.

BRIEF SUMMARY OF THE INVENTION

In accordance with the invention, a selectively-energizable interruption means is inserted in series between the secondary winding of a distribution transformer and a power-consuming load and is caused to open the path between transformer secondary winding and load for a time interval of predeterminedly specified duration, in vicinity of each zero crossing of the power line waveform during the time interval when a signal is to be transmitted and/or received at the load location. An impedance, in series between the distribution transformer secondary winding and a PLC transmitter and/or receiver, is selected to neutralize at least a portion of the secondary winding leakage inductance to provide increased power flow of the PLC signal. If a plurality of loads are connected in parallel to the secondary winding of a single distribution transformer, the interrupting means in series with each load includes means for recognizing an auxiliary transmission signal, which may be the PLC signal transmitted by the PLC equipment associated with one of the remaining loads, to assure that only one transmitter unit is connected to the transformer secondary winding during a particular time interval.

In a presently preferred embodiment, the series impedance utilized between the transformer secondary winding leakage inductance and the transmitter is a capacitance, of value selected to the series-resonant with the leakage inductance at the PLC carrier frequency. The interrupting device includes the zero crossing detector, means for recognizing the presence of a PLC carrier signal applied to the distribution transformer secondary winding, means for interrupting the flow of current from the secondary winding to a load, and means for controlling the interrupting means be operative in the vacinity of a zero crossing if a PLC signal is recognized as being transmitted or if a transmitter, receiver and/or transceiver associated with the load sends a signal indicating that interruption is to be present, whereby the associated PLC transmitter and/or receiver is to be connected to the communications network for transmission and/or reception of signals. If a single load is connected to a distribution transformer secondary winding, the PLC signal recognizing means is not required, as only one transmitting device is accordingly capable of transmitting to the distribution transformer secondary winding.

Accordingly, it is an object of the present invention to provide a method for efficiently coupling a PLC signal transmitter to a transformer winding.

It is another object of the present invention to provide novel apparatus allowing PLC carrier signals to be efficiently coupled through transformers in a power network.

These and other objects of the present invention will become apparent upon consideration of the following detailed description, when taken in conjunction with the drawings.

BRIEF DESCRIPTION OF THE DRAWING

FIGS. 3a–3d are a set of coordinated waveforms and useful in understanding the principles of the present invention.

DETAILED DESCRIPTION OF THE INVENTION

Figure 1:
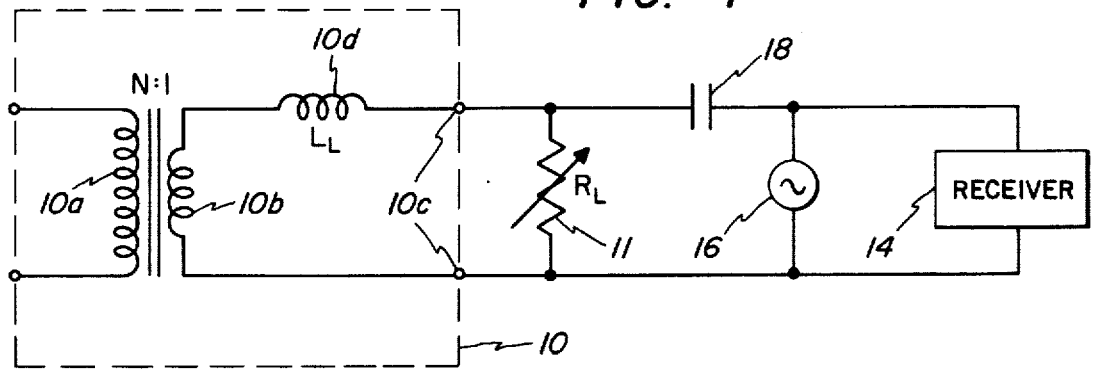
FIG. 1 is a schematic diagram illustrating the equivalent circuit of a distribution transformer, a load attached to the secondary winding thereof, and a PLC carrier transmitter.

Referring initially to FIG. 1, a distribution transformer 10 has the primary winding 10a thereof connected to a power distribution network (not shown) and receiving distribution potential, e.g. on the order of 13.2 KV. Transformer 10 acts to step-down the potential magnitude to provide, at terminals 10c associated with a secondary winding 10b, some relatively low voltage, e.g. 120 VAC), for utilization by a power-consuming load 11, of resistance magnitude $R_L$. Transformer 10 has a preselected magnitude $L_L$ of leakage inductance 10d, deliberately designed therein so as to limit short circuit current in the secondary winding 10b in the event of a secondary winding fault. Thus, leakage inductance 10d appears as an element in series with the transformer secondary winding, which element typically has an impedance equal to between about 5% and about 10% of the nominal full load impedance at the power line frequency. Accordingly, if transformer 10 is designed with a 5% leakage reactance 10d and is designed to power a load consuming 5 KVA. at 120 VAC, the reactance $X_L$ of the leakage conductance is approximately 0.15 Ohms, at 60 Hz. The magnitude of the power-consuming load resistance $R_L$ is not less than 3 Ohms.

At power line communication signal frequencies, such as at 10 kHz. by way of example only, the reactance of leakage inducance 10d is considerably higher than at the power line frequency. Thus, at the exemplary 10 kHz. carrier frequency, the impedance of inductance 10d would be about $+j25$ Ohms. The attenuation A to a signal at the power line carrier frequency as given as $A = |(R_L + jX_L)/R_L|$. Thus in the above illustrative example, $A = |(3+j25)/(3)| = 18.5$ dB. Additionally, there is an attenuation due to the voltage step-down turns ratio of the transformer. In the example, where a 13.2 KV. potential, in a Y-connected distribution system, is transformed down to a 120 VAC low voltage across load resistance $R_L$, the additional attenuation due to the transformer turns-ratio will be on the order of 36 dB., whereby the total attenuation is on the order of 54.5 dB., for signals inbound to a PLC receiver 14 connected across load 11. When signals are transmitted in the reverse, or outbound direction, as by coupling of a signal source (transmitter) 16, via a coupling capacitance 18, across load 11, the transformer turns ratio (N:1) provides a voltage step-up, to the network line impedance, which is on the order of 300 Ohms. However, the transformed line impedance seen by signal source 16, is now extremely low. Illustratively, utilizing the same conditions here and above set forth, the transformed network impedance, seen looking into terminals 10c, at the PLC carrier frequency of 10 kHz., is approximately 0.075 Ohms. The exemplary leakage reactance $X_L$, of leakage conductance 10d, is 25 Ohms and the attenuation due to the leakage reactance would therefore be on the order of 50 dB. Therefore, even though a 36 dB. voltage gain occurs due to the transformer turns-ratio voltage step-up action, a net attenuation, in this case of 16 dB., occurs. Further, due to the presence of load resistance 11, it is not always possible to significantly reduce the attenuation caused by the leakage reactance at PLC carrier frequencies. It is known, however, that capacitive bypassing across the distribution transformer, or use of an active repeater around the transformer, may aleviate some, or all, of the transformer attenuation, although in a relatively noncost-effective manner.

Figure 2:
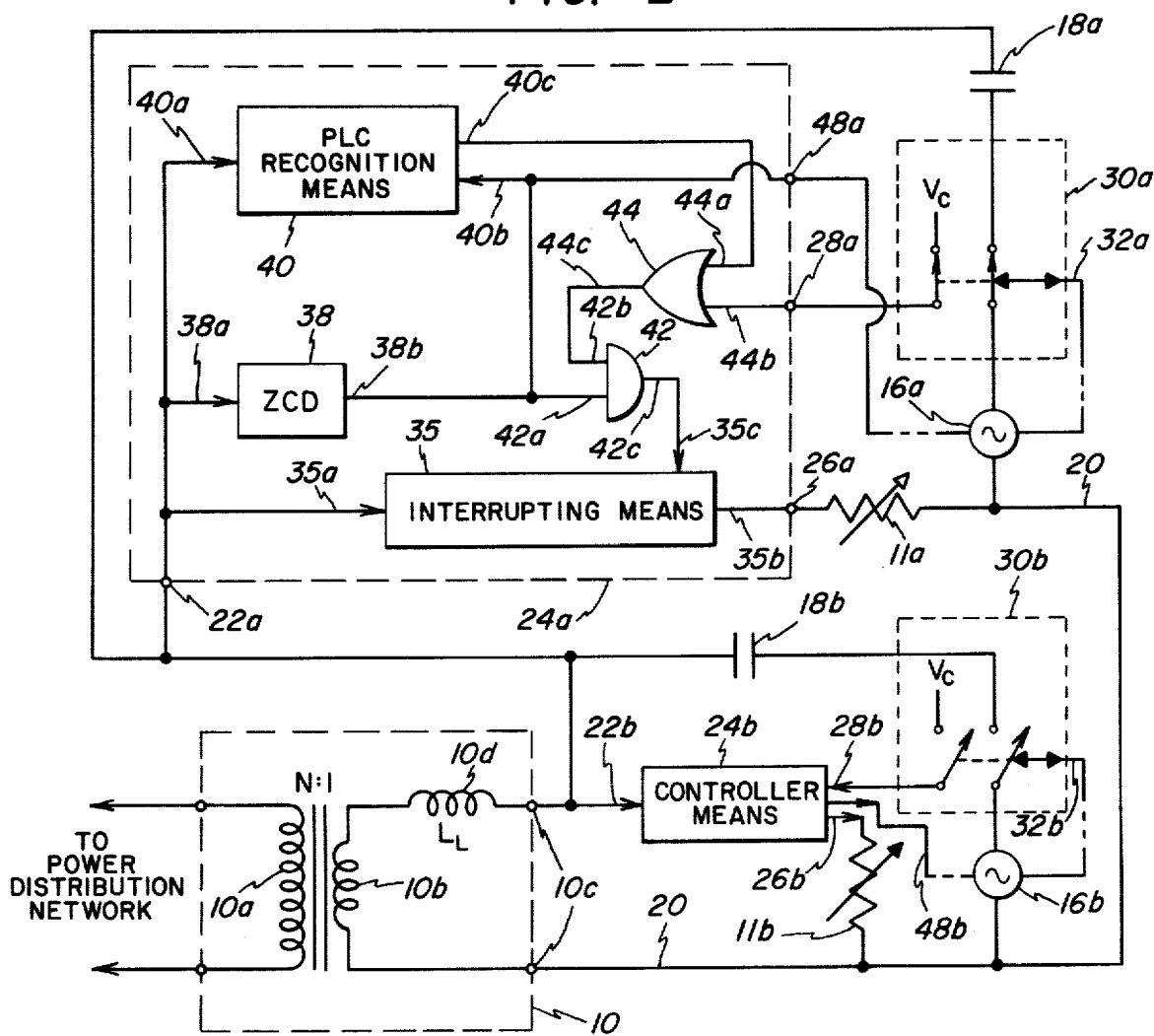
FIG. 2 is a schematic diagram of the distribution transformer, a pair of power-consuming loads and their associated PLC transmitters, and of apparatus utilizing the principles of the present invention for interrupting current flow to the loads when transmission and/or reception of a PLC carrier is to occur.

Referring now to FIGS. 2 and 3a–3d, the leakage reactance attenuation of transformer 10 is alleviated, in accordance with the invention, by interrupting current flow to all loads connected to the transformer secondary terminals 10c, in the vacinity of zero crossings of the power waveform, in order to provide a high impedance condition to allow the PLC carrier transmitters and/or receivers to be efficiently coupled to the power distribution and network. Connected in electrical parallel to one of transformer secondary winding terminals 10c (with the remaining terminal 10c being a neutral or common line 20) is the input 22 of at least one controller means 24. As illustrated in FIG. 2, a pair of controller means 24a and 24b are utilized with their respective inputs 22a and 22b connected in parallel to one of transformer secondary winding output terminals 10c. A load output 26a or 26b, respectively, of controller means 24a or 24b, respectively, is connected to an associated power-consuming load 11a or 11b, respectively. Each of controller means 24a and 24b has a control input 28a and 28b, respectively, at which an interruption-enable signal is provided from associated switch means 30a or 30b, respectively. Switch means 30a and 30b may also be utilized to connect an associated signal source and/or a receiver 16a or 16b, respectively, in series with a leakage reactance neutralizing element 18a or 18b, respectively, to the paralleled inputs 22a and 22b of the controller means and to that one of transformer secondary winding output terminals 10c to which the controller means inputs are connected.

For purposes of illustration only, and not by way of limitation, each of switch means 30a or 30b is a double-pole, single-throw switch, having both poles thereof substantially simultaneously closed, or opened, under control of a signal provided at a switch controlling input 32a or 32b, respectively, from control circuitry (not shown) associated with the transmitter and/or receiver generally designated by the associated one of sources 16a or 16b. While one pole of each of switch means 30a or 30b provides the series connection between the associated "source" 16 and the associated leakage reactance neutralizing element 18, the other switch pole provides a selectively-enabled series connection between the associated enable inputs 28a or 28b of the associated controller means and a source of control potential, of magnitude $V_C$. It should be understood that at least one, and typically several, controller means 24 are connected to the distribution transformer output terminals, with the number of controller means being dependent upon the number of different loads. In residential areas, wherein several homes receive utility electric power from a single distribution transformer, a controller may be utilized at each home (representing a single load upon the distribution transformer), or for a plurality of homes (such plurality being considered a single, parallel-connected load upon the distribution transformer).

Again by way of illustration, rather than by limitation, each controller means 24a may include an interrupting means 35, having an input 35a connected to the associated controller means input 22 and thence to the transformer secondary winding, and having an output 35b connected to the associated controller means output 26 and thence to the associated load 11. Interrupting means 35 normally forms a conductive path between the input 35a and output 35b thereof; a control input 35c is provided for causing interrupting means 35 to open the path between its input and output, upon receipt, and only for the duration of, a high logic level at input 35c. Also connected to the controller means input 22, receiving the transformer secondary winding potential, are the input 38a of a zero crossing detector (ZCD) means 38 and the line input 40a of a PLC recognition means 40. ZCD means 38 has an output 38b at which a high logic level appears whenever the transformer secondary winding potential has an absolute value less than a predetermined value, i.e. providing a high logic level pulse in the vicinity of each zero crossing of the power mains waveform. The ZCD means output 38D is connected to a reset R input 40b of the PLC recognition means 40, and also to a first input 42a of a two-input AND gate 42. By connection of ZCD means output 38d to PLC recognition means reset R input 40b, the recognition means is reset after each zero crossing is detected. A PLC recognition means output 40c is connected to a first input 44a of a two-input OR gate 44, having its remaining input 44b connected to the enable input 28a of the control means. The output 44c of OR gate 44 is connected to the remaining input 42b of AND gate 42. The AND gate output 42c is connected to interrupting means control input 35c. Each controller means (e.g. means 24a and 24b) may also provide the ZCD means output signal at an associated output 48a or 48b to control the associated communication apparatus 16a or 16b to be operative only during zero crossing time intervals.

In operation, PLC communication will only occur for a relatively small fraction of the total time during which one or more loads 11 receive power from the power distribution network. Thus, at all times, including some time $t_o$, the sinusoidal A.C. voltage waveform of FIG. 3a is applied across the transformer primary winding 10a and also appears at the transformer secondary winding output terminals 10c. This sinusoidal waveform is connected, via the normally-closed interrupting means 35 of each controller means 24, to the associated power-consuming load 11. At such time, e.g. $t_1$, at which the PLC apparatus associated with one of controller means 24 is to commence reception of in-bound carrier signals, from a central location, or is to transmit data out-bound to the central location, an enabling signal 50 (FIG. 3b) is provided at the associated control input 32 of the switch means 30 associated with that one of apparatus 16. For purposes of illustration only, switch means 30 is herein shown as being of the latching type, wherein a positive-going pulse 50 closes both poles of the switch means substantially simultaneously, and wherein a negative-going control pulse (e.g. pulse 58) will substantially simultaneously open both poles of that switch means.

When the AC sinusoidal waveform, at controller means input 22, decreases in absolute amplitude to be less than the triggering voltage amplitude $V_t$ (see FIG. 3a), the ZCD means output 38b changes to a high logic level (FIG. 3c) and remains at that level as long as the input voltage amplitude is less than the triggering voltage absolute amplitude, i.e. from time $t_2$ to time $t_3$, before reverting to the resting, low logic level. Thus a positive-going pulse 52 is produced in the vicinity of each zero crossing of the input waveform (FIG. 3a) and has a duration $T_p$ established by the predetermined triggering voltage $V_t$, and substantially centered about each zero crossing point 51 of the input waveform. The high logic level pulse 52 at gate input 42a, and the high logic level at gate input 42b (provided from control voltage $V_c$ source, via switch means 30 and OR gate 44), cause the AND gate output 42c to go to a high logic level. Means 35 is enabled to interrupt the path between the transformer secondary winding and the associated load 11. Thus, the waveshape of the voltage applied to, and current flowing through, a load 11 is as shown in FIG. 3d, having a sinusoidal shape except in the region 54 of duration time interval $T_p$, in which region 54 the load voltage and current are interrupted and fall to zero magnitude. At such time, the load is effectively disconnected from the transformer secondary winding terminals 10c, and only the PLC signaling apparatus 16 is connected thereacross, in series with leakage reactance neutralizing element 18. It will be seen that if element 18 is an electrical capacitance, having a capacitive reactance $-jX_C$ equal to the leakage reactance $+jX_L$, at the PLC carrier frequency, the reactances cancel one another and a series-resonant circuit is formed. The PLC apparatus 16 now sees only the transformed power distribution network line impedance and the attenuation caused by the leakage inductance is effectively removed. Illustratively, if the leakage inductance has a reactance of 25 Ohms at a PLC carrier frequency of 10 kHz., i.e. the leakage inductance $L_L$ is about 400 microhenries, a 25 Ohm series-resonating capacitive reactance is provided with a capacitance of about 0.64 microfarads. Such a capacitance value, having a working voltage on the order of several hundred volts for use with a 120 VAC line voltage, is a relatively low-cost and physically-small component. It should be understood that even if the capacitive reactance of series capacitance 18 does not tune the transformer secondary winding leakage inductance to series-resonance, the capacitive reactance which is actually provided will reduce the equivalent total reactance in series with the source and ideal transformer, and will therefore decrease the transformer attenuation.

PLC apparatus 16 is enabled to transmit and/or receive the PLC carrier during the time intervals $T_p$ when interrupting means 35 is enabled to remove the connection between the transformer 10 and load 11. Thus, during an illustrative one of such time intervals, the PLC carrier waveform 56 may be transmitted and/or received, as required, by its presence on the power distribution network lines and hence at transformer secondary winding terminals 10c.

The resulting increased PLC power flow during intervals 56 increases the signal-to-noise ratio. It should be understood that apparatus 16 may be suitably gated by the ZCD means output 38b to enable transmission and/or reception during the "shelf" intervals $T_P$ when current is prevented from flowing to the associated load 11.

The above description assumes that a single load is to be connected between transformer secondary winding terminals 10c. It should be understood that in a single load case, the PLC recognition means 40 and the OR gate 44 are not required. In the more typical case, a plurality of loads 11 are fed from the secondary winding of a single transformer. In this case, each load is connected through its associated controller 24 to the transformer secondary winding terminals 10c; each controller now includes the PLC recognition means 40 and the OR gate 44. PLC recognition means 40 may be any means suitable to recognize that the PLC apparatus associated with another controller means is actively utilizing the power line for communication purposes, and thus prevent the PLC apparatus associated with the controller means, of which that PLC recognition means is a part, from attempting to transmit and/or receive PLC signals until PLC usage by the other apparatus has terminated. As the various loads may be at widely scattered locations, the power line is the preferred physical connection between the various controller means associated with those loads. Accordingly, it is preferred that the PLC recognition means 40 at each controller means be utilized to check for the presence of a transmitted PLC carrier at the transformer secondary winding, to ascertain whether the PLC apparatus associated with another controller means-load combination is actually transmitting at a time when a first PLC apparatus associated with another load-controller means combination desires to transmit. Recognition means 40 may therefore be a PLC carrier receiver, tuned to the one or more carrier frequencies which may be used in any particular system, or may be a receiver tuned to a seperate carrier frequency, upon which an auxiliary carrier signal is transmitted by that one of PLC apparatus 16 then transmitting one or more PLC carriers. As PLC apparatus 16 only transmits within the zero crossing time intervals $T_p$, a data transmission may require more than one zero crossing time interval for completion, e.g. the time interval $T_m$ commencing at time $t_1$ and terminating at time $t_4$, when a negative-going pulse 58 at the switch means control input 32a disconnected PLC apparatus 16 from the leakage reactance neutralizing element 18. As each line waveform zero crossing resets recognition means 40, only the presence of another load-associated PLC apparatus transmitting the PLC carrier will prevent transmission of a carrier by a particular PLC apparatus. Therefore, if no PLC carrier signal is recognized by means 40 at the start of the zero crossing time interval $T_p$, recognition means output 40c will be disabled, whereby the presence of a control voltage signal $V_c$ at controller means input 28 causes interruption of current flow to the associated load commencement of transmission by the associated PLC apparatus 16. Upon receipt of a transmitted carrier from the PLC apparatus associated with another load, the controller means 24 associated with the non-transmitting and/or non-receiving loads detect the PLC carrier and cause interruption of current flow to their own associated loads for as long as the carrier is present.

While the present invention has been described with reference to the presently preferred embodiments thereof, many modifications and variations will now occur to those skilled in art. Accordingly, I intend to be limited only by the scope of the impending claims and not by the specific details presented for the embodiments described herein.

What is claimed is:

1. Apparatus for use in a power line carrier communications system having at least one load connected through a transformer to a power distribution network having a periodic network waveform voltage thereon, comprising:
   at least one means for selectively interrupting current flow to an associated power-consuming load, responsive to an interruption signal;
   means for detecting zero crossing of the network waveform voltage to provide an output signal to said interrupting means as said interruption signal to cause said interrupting means to interrupt current flow to said associated load for a time interval of predetermined duration in the vacinity of each network waveform zero crossing;
   communications means associated with at least one of said at least one load for transmitting and/or receiving power line carrier communications signals to and/or from said network when said interrupting means has interrupted current flow to said associated load; and
   an impedance element connected in series between said communications means and said transformer, said impedance element having a reactance selected to neutralize at least a portion of the leakage inductive reactance of said transformer to which said element is connected, at the carrier frequency of said power line communications signal.

2. The apparatus as set forth in claim 1, wherein said impedance element is a capacitance.

3. The apparatus as set forth in claim 1, wherein said transformer is a power network distribution transformer.

4. The apparatus as set forth in claim 3, wherein said impedance element is a capacitance element.

5. The apparatus as set forth in claim 1, wherein said communications means provides a signal whenever use of said network for communications purposes is required; said apparatus further comprising: a source of control potential; means for switching said control potential under control of said communications means signal; and means for providing said interruption signal only when both said control potential switching means is enabled and said zero crossing means output signal are present.

6. The apparatus as set forth in claim 5, wherein said interruption signal providing means is an AND gate having a first input receiving said control potential when said switching means is enabled, a second input receiving said zero crossing means output signal, and an output which is enabled only when both of said first and second inputs are enabled.

7. Apparatus for use with a power line carrier communications system having at least one transformer having a primary winding connected to a power distribution network having a periodic waveform voltage thereon, said system having a plurality of loads, each load connected to a secondary winding of said transformer, comprising:
   a like plurality of means each for detecting zero crossings of said network waveform voltage to each provide a zero crossing signal;
   a like plurality of means each for selectively interrupting current flow to an associated power-consuming load from the transformer secondary winding, each interrupting means being responsive to both an associated signal and an associated zero crossing signal;
   communications means associated with at least one of said loads for transmitting and/or receiving power line carrier communications signals to and/or from said network only when an associated zero crossing signal is present, said communications means also providing said associated signal to the interrupting means associated with the load with which said communications means is associated; and
   means associated with the remaining ones of said interrupting means for recognizing when another of said interrupting means is enabled to generate said associated signal to cause interruption of current flow to the load associated with said remaining ones of said interrupting means.

8. The apparatus as set forth in claim 7, wherein each of said recognizing means is a receiver tuned to at least one power line carrier frequency, and providing said associated signal whenever a signal at one of said at least one power line carrier frequency is received.

9. The apparatus as set forth in claim 7, wherein said communications means also transmits, when in operation, an auxiliary signal at a frequency which is other than a power line carrier frequency, and said recognizing means is a receiver tuned to the auxiliary signal.

10. The apparatus as set forth in claim 7, wherein said interrupting means interrupt current flow to all loads connectable to said transformer winding whenever the communications apparatus associated with any one of the loads is operational.

11. A method for providing power line communications on a power distribution network having a distribution transformer with at least one load connected to a secondary winding thereof, comprising the steps of:
  (a) providing power line carrier communication apparatus at at least one of the locations associated with a load;
  (b) detecting zero crossings of the network waveform to provide a zero crossing signal;
  (c) providing a communications control signal whenever said power line carrier communications apparatus is to be coupled to said transformer secondary winding;
  (d) selectively interrupting current flow to all loads connected to the transformer secondary winding when said zero crossing signal and said communications control signal are both present;
  (e) causing said communications apparatus to be operatively coupled to said secondary winding only when said zero crossing signal is present;
  (f) providing an impedance element connecting said communications apparatus to said transformer secondary winding; and
  (g) adjusting the reactance of said element to substantially neutralize the reactance of a leakage inductance associated with said transformer secondary winding at the carrier frequency of said power line carrier apparatus.

12. The method as set forth in claim 11, wherein the impedance element of step (f) is an electrical capacitance.

13. The method as set forth in claim 11, wherein said control signal of step (c) is a power line carrier signal transmitted by that one of the power line communications apparatus then operatively coupled to said secondary winding; and step (d) includes the step of detecting said control signal as a carrier signal across said secondary winding.

14. The method as set forth in claim 11, further comprising the step of transmitting an auxiliary control signal on a frequency other than the frequency of a powerline communications carrier from that one of said communications apparatus then coupled to said secondary winding; and step (d) includes the step of detecting said auxiliary control signal across said secondary winding as said communications control signal.

* * * * *